US011476531B2

United States Patent
Idikurt et al.

(10) Patent No.: US 11,476,531 B2
(45) Date of Patent: Oct. 18, 2022

(54) BATTERY MODULE FOR A HIGH-VOLTAGE BATTERY OF A MOTOR VEHICLE, HIGH-VOLTAGE BATTERY AND VEHICLE

(71) Applicant: Bayerische Motoren Werke Aktiengesellschaft, Munich (DE)

(72) Inventors: Tuncay Idikurt, Munich (DE); Daniel Scherer, Munich (DE); Johannes Thannheuser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 132 days.

(21) Appl. No.: 16/830,571

(22) Filed: Mar. 26, 2020

(65) Prior Publication Data
US 2020/0227703 A1    Jul. 16, 2020

Related U.S. Application Data

(63) Continuation of application No. PCT/EP2018/080168, filed on Nov. 5, 2018.

(30) Foreign Application Priority Data

Dec. 4, 2017 (DE) ..................... 10 2017 221 769.3

(51) Int. Cl.
*H01M 50/20* (2021.01)
*B60L 58/26* (2019.01)
(Continued)

(52) U.S. Cl.
CPC ....... *H01M 50/20* (2021.01); *H01M 10/0481* (2013.01); *H01M 10/613* (2015.04);
(Continued)

(58) Field of Classification Search
None
See application file for complete search history.

(56) References Cited

U.S. PATENT DOCUMENTS 10,056,657 B2    8/2018    Goesmann et al.
2006/0275650 A1    12/2006    Yamada et al.
(Continued)

FOREIGN PATENT DOCUMENTS

CN    101132058 A    2/2008
CN    102237546 A    11/2011
(Continued)

OTHER PUBLICATIONS

International Search Report (PCT/ISA/210) issued in PCT Application No. PCT/EP2018/080168 dated Jan. 9, 2019 with English translation (six pages).

(Continued)

*Primary Examiner* — Lisa S Park
(74) *Attorney, Agent, or Firm* — Crowell & Moring LLP

(57) ABSTRACT

A battery module for a high-voltage battery of a motor vehicle has at least two battery cells, two pressure plates, between which the battery cells are arranged, and at least two tie rods, which are led along opposite side regions of the at least two battery cells and which are connected to the pressure plates, forming a cell module frame surrounding the battery cells and pressing the battery cells against one another. The tie rods are integrally connected to the respective side regions of the battery cells by an adhesive connection.

9 Claims, 1 Drawing Sheet

(51) Int. Cl.
  *H01M 10/653* (2014.01)
  *H01M 10/04* (2006.01)
  *H01M 10/625* (2014.01)
  *H01M 10/6554* (2014.01)
  *H01M 10/613* (2014.01)
  *H01M 10/647* (2014.01)
  *H01M 10/6555* (2014.01)

(52) U.S. Cl.
  CPC ....... *H01M 10/625* (2015.04); *H01M 10/647* (2015.04); *H01M 10/653* (2015.04); *H01M 10/6555* (2015.04); *H01M 2220/20* (2013.01)

(56) References Cited

U.S. PATENT DOCUMENTS

| | | | |
|---|---|---|---|
| 2006/0275656 A1* | 12/2006 | Feddrix | H01M 50/209 |
| | | | 429/179 |
| 2011/0262797 A1 | 10/2011 | Kim | |
| 2012/0121965 A1* | 5/2012 | Makino | H01M 4/70 |
| | | | 429/163 |
| 2013/0260611 A1 | 10/2013 | Ahn | |
| 2014/0038021 A1* | 2/2014 | Goesmann | H01M 10/625 |
| | | | 429/120 |
| 2014/0072855 A1 | 3/2014 | Schaefer | |
| 2014/0212738 A1 | 7/2014 | Woehrle et al. | |
| 2014/0322588 A1 | 10/2014 | Duernegger | |
| 2017/0077545 A1* | 3/2017 | Shaffer, II | H01M 10/0468 |
| 2017/0141367 A1 | 5/2017 | Kim et al. | |
| 2018/0097209 A1* | 4/2018 | Striegel | H01M 50/154 |

FOREIGN PATENT DOCUMENTS

| | | |
|---|---|---|
| CN | 102782896 A | 11/2012 |
| CN | 103367686 A | 10/2013 |
| CN | 103403917 A | 11/2013 |
| CN | 104115301 A | 10/2014 |
| CN | 204303901 U | 4/2015 |
| CN | 106711367 A | 5/2017 |
| CN | 107078243 A | 8/2017 |
| DE | 10 2010 020 065 A1 | 11/2011 |
| DE | 10 2010 050 992 A1 | 5/2012 |
| DE | 10 2011 013 617 A1 | 9/2012 |
| DE | 10 2011 007 069 A1 | 10/2012 |
| DE | 10 2011 076 580 A1 | 11/2012 |
| DE | 10 2011 079 289 A1 | 1/2013 |
| DE | 10 2014 204 737 A1 | 9/2015 |
| DE | 10 2014 219 353 A1 | 3/2016 |
| DE | 10 2015 205 481 A1 | 9/2016 |
| WO | WO 2015/196046 A1 | 12/2015 |

OTHER PUBLICATIONS

German-language Written Opinion (PCT/ISA/237) issued in PCT Application No. PCT/EP2018/080168 dated Jan. 9, 2019 (six pages).
German-language Search Report issued in German Application No. 10 2017 221 769.3 dated Jul. 27, 2018 with partial English translation (14 pages).
Chinese-language Office Action issued in Chinese Application No. 201880058556.2 dated Dec. 2, 2021 with English translation (16 pages).
Chinese-language Office Action issued in Chinese Application No. 201880058556.2 dated Jun. 15, 2022 with English translation (14 pages).

* cited by examiner

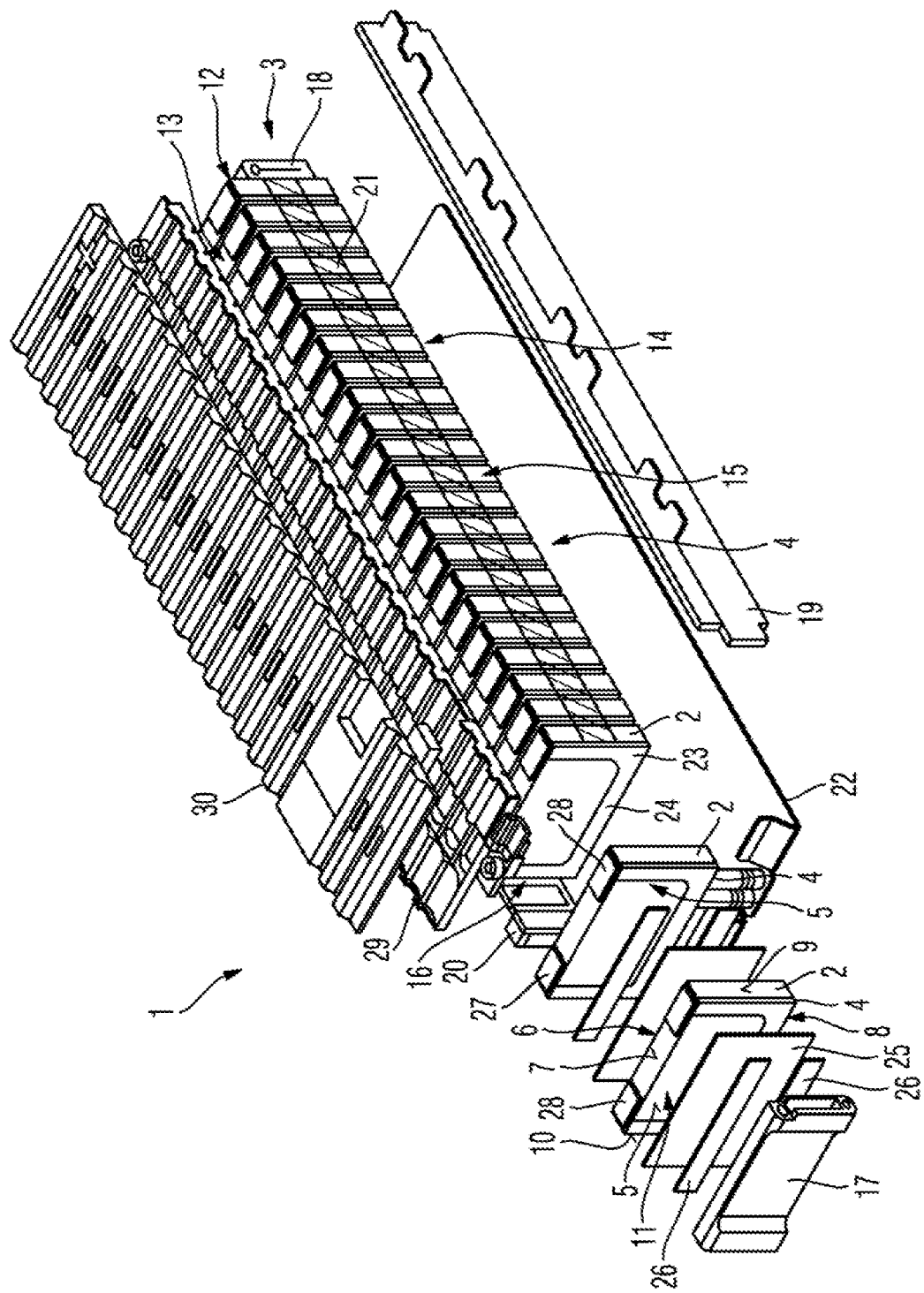

BATTERY MODULE FOR A HIGH-VOLTAGE BATTERY OF A MOTOR VEHICLE, HIGH-VOLTAGE BATTERY AND VEHICLE

CROSS REFERENCE TO RELATED APPLICATIONS

This application is a continuation of PCT International Application No. PCT/EP2018/080168, filed Nov. 5, 2018, which claims priority under 35 U.S.C. § 119 from German Patent Application No. 10 2017 221 769.3, filed Dec. 4, 2017, the entire disclosures of which are herein expressly incorporated by reference.

BACKGROUND AND SUMMARY OF THE INVENTION

The invention relates to a battery module for a high-voltage battery of a motor vehicle, having at least two battery cells, having two pressure plates between which the battery cells are arranged, and having at least two tie rods which are guided along opposite side regions of the at least two battery cells and which are connected to the pressure plates, forming a cell module frame which surrounds the battery cells and presses the battery cells together. The invention also concerns a high-voltage battery for a motor vehicle and a motor vehicle.

In the present case, interest is directed toward high-voltage batteries, which are used, for example, to supply energy to an electric drive machine of a motor vehicle designed as an electric vehicle or hybrid vehicle. Such high-voltage batteries usually comprise a large number of prismatic battery cells connected to form battery modules or cell packages. In the manufacture of the battery module, the battery cells are usually pressed in a displacement-controlled and force-monitored way and clamped and held in shape by a surrounding cell module frame. Such a cell module frame can be, for example, an aluminum frame which is formed from two pressure plates and at least two tie rods and which is described in DE 10 2014 219 353 A1, for example. The prismatic battery cells are arranged between the pressure plates and pressed together. The tie rods are attached to the pressure plates to connect the pressure plates to each other and to maintain the clamped condition. High-voltage insulation between the battery cells and the aluminum frame is provided by additional plastic insulation jackets, for example. Low-voltage insulation between the individual battery cells can be implemented, for example, by use of plastic adhesive films.

Such an arrangement of battery cells usually generates heat, which must be dissipated to prevent the battery module from overheating. For this purpose, a cooling device for cooling the battery cells can be provided underneath the battery module. Between the battery module and the cooling device, electrical high-voltage insulation is also necessary, which can be implemented, for example, by using another plastic film. It is known from DE 10 2015 205 481 A1 that at least that outer surface of a metallic cell housing of the battery cells which faces the cooling device should be coated with a UV-radiation curable lacquer. This lacquer, which can eliminate the need for the plastic film, also ensures high thermal conductivity between the battery module and the cooling device, and thus reliable heat dissipation.

It is the object of the present invention to provide a battery module optimized with respect to mechanical stability and electrical insulation for a high-voltage battery of a motor vehicle.

According to the invention, this object is achieved by a battery module, a high-voltage battery and a motor vehicle with the features according to the respective independent patent claims. Beneficial embodiments of the invention are the subject of the dependent patent claims, the description and the figure.

A battery module according to the invention for a high-voltage battery of a motor vehicle has at least two battery cells, two pressure plates between which the battery cells are arranged, and at least two tie rods which are guided along opposite side regions of the at least two battery cells and which are connected to the pressure plates, forming a cell module frame which surrounds the battery cells and presses the battery cells together. In addition, the tie rods are connected to the respective side regions of the battery cells by means of an adhesive bond in a materially integral manner.

The high-voltage battery is in particular a traction battery for providing electrical energy for an electrically powered motor vehicle. For this purpose, the high-voltage battery can have several interconnected battery modules. In particular, each battery module has a large number of battery cells connected in series, for example. The battery cells are in particular prismatic battery cells, which have a cuboid cell housing in a flat design.

The cell housing of the battery cells has a bottom side, a top side, a front side, a rear side and two side regions. To form a cuboid cell stack, a front side of the cell housing of one battery cell is arranged in each case on the rear side of the cell housing of another battery cell. The battery cells are thus stacked or lined up one behind the other, where a front side of the cell stack is formed by the front side of the cell housing of a first battery cell in the cell stack and a rear side of the cell stack is formed by the rear side of the cell housing of a last battery cell in the cell stack. The side regions of the cell housings of the stacked battery cells form opposite side regions of the cell stack, the top sides of the cell housings of the battery cells stacked together form a top side of the cell stack, and the bottom sides of the cell housings of the battery cells stacked together form a bottom side of the cell stack. In particular, the battery cells have a pair of cell connections on the top side of the respective cell housing with a positive cell connection and a negative cell connection. Via a cell contacting system, which is placed on the top side of the cell stack, for example, and which has electrical connection elements for connecting the cell connections or cell terminals of adjacent battery cells, the battery cells can be interconnected.

A first pressure plate is arranged on the front side of the cell stack and a second pressure plate is arranged on the rear side of the cell stack opposite the front side. The pressure plates are pressed together so that the battery cells are pressed together. The pressure plates pressing the battery cells together are connected to each other via the respective tie rods so that the battery cells remain in the pressed condition or the cell stack is held in shape. The tie rods are also bonded to the opposite side regions of the cell stack and thus connected to the cell stack in a materially integral manner. In particular, the adhesive bond for the materially adhesive connection of the tie rod to the cell stack comprises a polyurethane adhesive and/or an epoxy adhesive and/or an acrylic adhesive. The mechanical stabilization of the battery module provided by the cell module frame is further enhanced by the additional bonding of the tie rods to the cell stack in a beneficial manner. The cell module frame, which is glued at least in some areas, in a beneficial manner can thus prevent distortion of the cell housings of the battery cells during operation of the high-voltage battery.

Preferably, the pressure plates are also connected to the battery cell adjacent to the respective pressure plate by means of the adhesive bond in a materially integral manner. Therefore, the first pressure plate is glued to the front side of the cell stack and the second pressure plate is glued to the rear side of the cell stack. Connection points between the pressure plates and the tie rods, that is, corners of the rectangular-shaped cell module frame, are for example welded and/or glued. A mechanically particularly stable battery module can be provided by connecting the entire cell module frame to the cell stack in a materially integral manner using the adhesive bond.

It may be provided that the battery cells have a metallic cell housing which is coated at least in some areas with an electrically insulating lacquer. The electrically insulating lacquer is in particular a lacquer that can be cured by UV-radiation. The electrically insulating lacquer can be used to insulate the metallic cell housing, so that, for example, the battery cells adjacent to each other in the cell stack, the battery cells and the pressure plates, as well as the battery cells and the tie rods can be arranged adjacent to each other without the need for any other objective insulation element. This allows a particularly weight-saving and space-optimized battery module to be provided.

It proves to be beneficial if at least bottom sides of the battery cells for connecting the bottom sides to a metallic cooler are completely coated with the lacquer. In particular, the bottom sides are connected to the metallic cooler for cooling the battery module by means of a further adhesive bond in a materially integral manner, the further adhesive bond comprising a thermally conductive material for thermal coupling between the battery module and the cooler. The cooler can be made of a metallic material with good thermal conductivity, such as aluminum. The bottom side of the cell stack is coated with the electrically insulating lacquer, so that the cell stack can be connected directly to the cooler without the need for an additional objective insulation element between the cell stack and the cooler. The lacquer as well as the further, thermally conductive adhesive bond between the lacquer and the cooler cause in particular high thermal conductivity, so that the waste heat generated during operation of the battery cells can be supplied to the cooler with particular reliability.

A U-shaped area of a rectangular-shaped front side and/or rear side of the respective cell housings is particularly preferred to be coated with the lacquer, the U-shaped area being formed by edge areas of the front side and/or rear side adjoining edges of the rectangular-shaped top side. This means that the lacquer is only arranged in certain areas on the front side and/or rear side of the cell housings. In particular the edge area of two short sides of the front side and/or rear side adjacent to the side regions of the cell housings and an edge area of a long side of the front side and/or rear side adjacent to the bottom side of the cell housings are coated with the lacquer. An edge area of a long side of the front side and/or rear side adjacent to the top side of the cell housings is not coated with the lacquer, at least not in some areas. This means that the lacquer on the bottom side and side regions of the cell housings of the battery cells has partially extended beyond the edge and thus runs out on the front side and/or rear side. If the front side and rear side are coated with the lacquer in the U-shaped area, an electrically insulating film, for example a self-adhesive plastic film, can be arranged between the front side of a battery cell and the rear side of an adjacent battery cell. However, it can also be provided that, for example, only the front sides of the cell housings in the U-shaped area are coated with the lacquer, while the rear sides of the cell housings are completely coated with the lacquer. This means that, when the battery cells are arranged in a row, where the partially coated front side meets a completely coated rear side, there is no need for an objective insulation element between the battery cells. As a result, manufacturing, assembly and material costs can be reduced in a beneficial manner.

The invention also relates to a high-voltage battery for a motor vehicle with at least one battery module according to the invention or an embodiment thereof. The high-voltage battery is in particular a traction battery for providing electrical energy for an electrical drive of the motor vehicle.

A motor vehicle according to the invention comprises a high-voltage battery according to the invention. The motor vehicle is designed in particular as an electric vehicle or hybrid vehicle.

The embodiments presented with reference to the battery module according to the invention and their advantages apply accordingly to the high-voltage battery according to the invention and to the motor vehicle according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a schematic exploded view of an embodiment of a battery module according to the invention.

DETAILED DESCRIPTION OF THE DRAWING

FIG. 1 shows a battery module 1 for a high-voltage battery—not shown here—of a motor vehicle likewise not shown here. The high-voltage battery can, for example, provide electrical energy for a drive of the motor vehicle, which is designed as an electric vehicle or hybrid vehicle. The battery module 1 has a large number of battery cells 2, which are stacked on one another or lined up one behind the other to form a cell stack 3. Each battery cell 2 has a flat rectangular-shaped metallic cell housing 4 with a front side 5, a rear side 6, a top side 7, a bottom side 8 and two opposite side regions 9, 10. To form the cell stack 3, a front side 5 of the cell housing 4 of one battery cell 2 is arranged in each case on the rear side 6 of the cell housing 4 of another battery cell 2. The front side 5 of the cell housing 4 of a first battery cell 2 in the cell stack 3 forms a front side 11 of the cell stack 3 and the rear side 6 of the cell housing 4 of a last battery cell 2 in the cell stack 3 forms a rear side 12 of the cell stack 3. The top sides 7 of the cell housings 4 form a top side 13 of the cell stack 3 and the bottom sides 8 of the cell housings 4 form a bottom side 14 of the cell stack 3. First side regions 9 of the cell housings 4 form a first side region 15 of the cell stack 3 and second side regions 10 form a second side region 16 of the cell stack 3 opposite the first side region 15.

In addition, the battery module 1 has a first, front pressure plate 17, which is arranged on the front side 11 of the cell stack 3, and a second, rear pressure plate 18, which is arranged on the rear side 12 of the cell stack 3. The pressure plates 17, 18 are pressed (clamped) together and connected to one another by tie rods 19, 20. For example, the pressure plates 17, 18 and the tie rods 19, 20 can be glued or welded at their respective connection points. The pressure plates 17, 18 and the tie rods 19, 20 form a cell module frame by which the battery cells 2 are pressed together and the cell stack 3 is held in shape. A first tie rod 19 is connected to the first side region 15 of the cell stack 3 by means of an adhesive bond 21 in a materially integral manner and a second tie rod 20 is connected to the second side region 16 of the cell stack 3 by means of the adhesive bond 21 in a materially integral manner. Due to the adhesive bonds 21 between the tie rods 19, 20 and the cell stack 3, the battery module 1 has a particularly high mechanical stability. The pressure plates 17, 18 can also be connected to the front side 11 and the rear side 12 of the cell stack 3 by means of an adhesive bond in a materially integral manner. The entire cell module frame is thus connected to the cell stack 3 by means of the adhesive bond 21 in a materially integral manner. The adhesive bond 21 can have an epoxy adhesive, a polyurethane adhesive or an acrylic adhesive.

The battery module 1 also has a cooler 22 here, which is designed to the cool cell stack 3. For this purpose, the cooler 22 is arranged on the bottom side 14 of the cell stack 3. The cooler 22 has in particular a metallic material with good thermal conductivity, for example aluminum. For electrical insulation between the cooler 22 and the battery cells 2, at least the bottom side 8 of the cell housings 4 is coated with an electrically insulating, UV-curable lacquer 23. Due to the insulation provided by the lacquer 23, no further objective insulation components between the cell stack 3 and the cooler 22 are required. To fasten the cooler 22 to the cell stack 3, the bottom side 15 of the cell stack 3 and the cooler 22 can be connected together by means of a further adhesive bond with good thermal conductivity in a materially integral manner.

The lacquer 23 can be arranged in a U-shaped area 24 on the front sides 5 and/or the rear sides 6 of the cell housings 4. In this example, both the front sides 5 and the rear sides 6 of the cell housings 4 of the battery cells 2 are coated with the lacquer 23 only in the U-shaped area 24. To manufacture the electrical insulation, an insulating layer 25, for example an insulating plastic film, is arranged in each case between adjacent battery cells 2 and between the battery cells 2 and the respective pressure plates 17, 18, which is connected to the cell housings 4 or the pressure plates 17, 18 via adhesive tapes 26. However, it is also possible that only the front side 5 of the cell housings 4 in the U-shaped area 24 is coated with lacquer 23, whereas the rear sides 6 are completely coated with the lacquer 23. In this case the insulating layer 25 between the battery cells 2 can be omitted.

On the top side 7 the battery cells 2 have respective cell connections 27, 28. For serial connection of the battery cells 2, a first cell connection 27, for example a positive cell terminal, of a battery cell 2 is electrically connected to a second cell connection 28, for example a negative cell terminal, of a previous battery cell 2 in the cell stack 3. To manufacture the electrical connection, a cell contacting system 29 can be placed on the top side 13 of the cell stack 3, which has electrical connection elements. A cover element 30 can be placed on the cell contacting system 29 to cover the battery module 1.

LIST OF REFERENCE SIGNS

1 Battery module
2 Battery cell
3 Cell stack
4 Cell housing
5 Front side of the cell housing
6 Rear side of the cell housing
7 Top side of the cell housing
8 Bottom side of the cell housing
9 First side region of the cell housing
10 Second side region of the cell housing
11 Front side of the cell stack
12 Rear side of the cell stack
13 Top side of the cell stack
14 Bottom side of the cell stack
15 First side region of the cell stack
16 Second side region of the cell stack
17 First pressure plate
18 Second pressure plate
19 First tie rod
20 Second tie rod
21 Adhesive bond
22 Cooler
23 Lacquer
24 U-shaped area
25 Insulating layer
26 Adhesive tape
27 First cell connection
28 Second cell connection
29 Cell contacting system
10 Cover element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery module for a high-voltage battery of a motor vehicle, comprising:
    at least two battery cells;
    two pressure plates between which the battery cells are arranged; and
    at least two tie rods which are guided along opposite side regions of the at least two battery cells and which are connected to the pressure plates, forming a cell module frame which surrounds the battery cells and presses the battery cells together, wherein
    the tie rods are connected to the respective side regions of the battery cells by an adhesive bond in a materially integral manner,
    each of the battery cells has a metallic cell housing which is coated at least in some areas with an electrically insulating lacquer,
    only a U-shaped area of a rectangular-shaped front side of a first cell housing of a first battery cell is coated with the lacquer, while a remaining area of the front side of the first cell housing is uncoated,
    an entire area of a rectangular-shaped rear side of a second cell housing of a second battery cell is coated with the lacquer, and
    the front side of the first cell housing of the first battery cell is immediately adjacent to the rear side of the second cell housing of the second battery cell.

2. The battery module according to claim 1, wherein
    the pressure plates are also connected to the battery cell adjacent to the respective pressure plate by the adhesive bond in a materially integral manner.

3. The battery module according to claim 2, wherein
    the adhesive bond comprises a polyurethane adhesive, an epoxy adhesive, and/or an acrylic adhesive.

4. The battery module according to claim 1, wherein
at least bottom sides of the battery cells for connecting the bottom sides to a metallic cooler are completely coated with the lacquer.

5. The battery module according to claim 4, wherein the bottom sides are connected to the metallic cooler for cooling the battery module by a further adhesive bond in a materially integral manner, the further adhesive bond comprising a thermally conductive material for thermal coupling between the battery module and the cooler.

6. The battery module according to claim 1, wherein the U-shaped area is formed along edge areas of the front side.

7. The battery module according to claim 6, wherein the edge areas are arranged along two short sides and one long side of the front side.

8. A high-voltage battery for a motor vehicle comprising at least one battery module according to claim 1.

9. A motor vehicle comprising a high-voltage battery according to claim 8.

* * * * *